(12) United States Patent
Koyama et al.

(10) Patent No.: US 8,125,541 B2
(45) Date of Patent: Feb. 28, 2012

(54) IMAGE-SENSING APPARATUS

(75) Inventors: Kanichi Koyama, Osaka (JP); Yukio Mori, Osaka (JP)

(73) Assignee: SANYO Electric Co., Ltd., Moriguchi (JP)

( * ) Notice: Subject to any disclaimer, the term of this patent is extended or adjusted under 35 U.S.C. 154(b) by 203 days.

(21) Appl. No.: 12/603,813

(22) Filed: Oct. 22, 2009

(65) Prior Publication Data

US 2010/0103291 A1  Apr. 29, 2010

(30) Foreign Application Priority Data

Oct. 24, 2008  (JP) ................. 2008-274267

(51) Int. Cl.
*H04N 5/262* (2006.01)
(52) U.S. Cl. ................. 348/240.3; 348/240.99
(58) Field of Classification Search ........................ None
See application file for complete search history.

(56) References Cited

U.S. PATENT DOCUMENTS

| | | | | |
|---|---|---|---|---|
| 6,297,846 | B1 * | 10/2001 | Edanami | 348/239 |
| 7,420,598 | B1 * | 9/2008 | Ito | 348/240.2 |
| 7,701,492 | B2 * | 4/2010 | Motomura et al. | 348/240.2 |
| 2005/0174451 | A1 * | 8/2005 | Nozaki et al. | 348/240.99 |

FOREIGN PATENT DOCUMENTS

| | | |
|---|---|---|
| JP | 2000-184259 | 6/2000 |
| JP | 2007000205 | 1/2007 |

* cited by examiner

*Primary Examiner* — Luong T Nguyen
(74) *Attorney, Agent, or Firm* — NDQ&M Watchstone LLP

(57) ABSTRACT

An image-sensing apparatus has: an optical zoom control portion varying the size of the subject image on the source images by optical zooming; a particular subject detection portion detecting the position and size of a particular subject on the source images based on the image data of the source images; a narrow-angle image extraction portion setting a narrow-angle image including the particular subject to set the position and size of the narrow-angle image on image; a wide-angle image extraction portion extracting a wide-angle image that includes the narrow-angle image; a resolution enhancement processing portion cutting out a plurality of narrow-angle images according to a setting in the narrow-angle image extraction portion, to generate a narrow-angle high-resolution image having a number of pixels greater than the number of pixels of the narrow-angle image. The optical zoom control portion controls the factor of the optical zooming such that the ratio of the reference number of pixels to the number of pixels of the narrow-angle image approaches the factor of enlargement by the resolution enhancement processing portion.

6 Claims, 10 Drawing Sheets

SOURCE IMAGE AT TIME POINT $t_n$

SOURCE IMAGE AT TIME POINT $t_n$

WIDE-ANGLE IMAGE AT TIME POINT $t_n$

SIMPLE RESOLUTION CONVERSION

IMAGE-SENSING APPARATUS

This nonprovisional application claims priority under 35 U.S.C. §119(a) on Patent Application No. 2008-274267 filed in Japan on Oct. 24, 2008, the entire contents of which are hereby incorporated by reference.

BACKGROUND OF THE INVENTION

1. Field of the Invention

The present invention relates to an image-sensing apparatus such as a digital video camera.

2. Description of Related Art

There has been proposed resolution enhancement processing—processing whereby one high-resolution image is generated from a plurality of low-resolution images. Such resolution enhancement processing is also called super-resolution processing. The ratio of the number of pixels of the high-resolution image to the number of pixels of the low-resolution image represents the factor of enlargement at which the number of pixels is increased by super-resolution processing. In principle, the factor of enlargement can be made as high as one desires by appropriately setting the number of low-resolution images used for generation of the high-resolution image.

Inconveniently, however, an increase in the number of low-resolution images used for generation of the high-resolution image results in an increase in the calculation burden for super-resolution processing and an increase in the circuit scale needed for the calculation. Moreover, in practice, once the factor of enlargement has reached a certain factor, increasing it further brings hardly any further enhancement in the practical resolution (the maximum spatial frequency expressible in an image). Accordingly, an upper limit is prescribed on the factor of enlargement by which the number of pixels is increased by a resolution enhancement processing portion (super-resolution processing portion) incorporated in an image-sensing apparatus.

The resolution enhancement processing portion can perform super-resolution processing with the factor of enlargement set at any factor equal to or less than the upper-limit factor. The resolution-enhancing effect of the super-resolution processing, however, is maximized when the factor of enlargement at which the number of pixels is increased by super-resolution processing is as high as the upper-limit factor (e.g., because, in a case where the upper-limit factor is 4, setting the actual factor of enlargement at 1.01 does not bring hardly any enhancement in resolution). Accordingly, when super-resolution processing is performed, it is preferable that the ratio of the number of pixels of the high-resolution image to that of the low-resolution image be made equal to the upper-limit factor.

On the other hand, there has been disclosed a method for detecting a specified subject of interest by image processing with a view to cutting out, from the shot image, an image with a composition fit for the subject of interest by clipping processing.

Using this method, it is possible to present the user with a clipped image in which the subject of interest appears large. Inconveniently, however, the clipping processing involved degrades image quality. For example, in a case where the shot image has a number of pixels of 1280 horizontally by 720 vertically (expressed as 1280×720) and from it a clipped image with a number of pixels of (640×360) is cut out, the image presented to the user comes to have ¼ the number of pixels of the shot image.

Such degradation in image quality resulting from clipping processing may be compensated for by super-resolution processing. Inconveniently, however, since, as described above, there is an upper limit on the factor of enlargement at which the number of pixels is increased by super-resolution processing, and in addition there is an optimum value for the factor of enlargement at which the effect of resolution enhancement is maximized, if clipping processing is performed with no consideration given to the number of pixels of the clipped image, it is not possible to present the user with an image with satisfactory quality.

SUMMARY OF THE INVENTION

According to the present invention, an image-sensing apparatus is provided with: an image sensor which sequentially acquires source images by sequential shooting; an optical zoom control portion which varies the size of the subject image on the source images by optical zooming; a particular subject detection portion which detects the position and size of a particular subject on the source images based on the image data of the source images; a narrow-angle image extraction portion which sets, in each of the source images, a narrow-angle image including the particular subject based on the result of detection by the particular subject detection portion, to set the position and size of the narrow-angle image on image; a wide-angle image extraction portion which extracts, from each of the source images, a wide-angle image that includes the narrow-angle image, that has a larger angle of view than the narrow-angle image, and that has a reference number of pixels; a resolution enhancement processing portion which cuts out, from a plurality of temporally consecutive wide-angle images, a plurality of narrow-angle images according to a setting in the narrow-angle image extraction portion, to generate, from the plurality of narrow-angle images, a narrow-angle high-resolution image having a number of pixels greater than the number of pixels of the narrow-angle image; and a recording portion which records the image data of the individual wide-angle images. Here, the optical zoom control portion controls the factor of the optical zooming such that the ratio of the reference number of pixels to the number of pixels of the narrow-angle image approaches the factor of enlargement by the resolution enhancement processing portion.

Specifically, for example, narrow-angle images based on source images shot at first and second time points are called the first and second narrow-angle images; the second time point is later than the first time point; and when the ratio of the reference number of pixels to the number of pixels of the first narrow-angle image is greater than the factor of enlargement, the optical zoom control portion increases the factor of optical zooming between the first and second time points and thereby makes, compared with the ratio of the reference number of pixels to the number of pixels of the first narrow-angle image, the ratio of the reference number of pixels to the number of pixels of the second narrow-angle image approach the factor of enlargement.

Moreover, for example, in a case where the ratio of the reference number of pixels to the number of pixels of the first narrow-angle image is greater than the factor of enlargement, if at the first time point the factor of optical zooming has reached a predetermined upper-limit factor, the wide-angle image extraction portion extracts from the source image at the first time point an image that has a number of pixels equal to the factor of enlargement times the number of pixels of the first narrow-angle image and that includes the first narrow-angle image, and yields an image obtained by increasing the number of pixels of the extracted image up to the reference number of pixels by resolution conversion as a wide-angle image to be extracted from the source image at the first time point.

Specifically, for another example, narrow-angle images based on source images shot at first and second time points are called the first and second narrow-angle images; the second time point is later than the first time point; and when the ratio of the reference number of pixels to the number of pixels of the first narrow-angle image is smaller than the factor of enlargement, the optical zoom control portion decreases the factor of optical zooming between the first and second time points and thereby makes, compared with the ratio of the reference number of pixels to the number of pixels of the first narrow-angle image, the ratio of the reference number of pixels to the number of pixels of the second narrow-angle image approach the factor of enlargement.

Moreover, for example, in a case where the ratio of the reference number of pixels to the number of pixels of the first narrow-angle image is smaller than the factor of enlargement, if at the first time point the factor of optical zooming has reached a predetermined lower-limit factor, the wide-angle image extraction portion extracts from the source image at the first time point an image that has a number of pixels larger than the reference number of pixels and that includes the first narrow-angle image, and yields an image obtained by decreasing the number of pixels of the extracted image up to the reference number of pixels by resolution conversion as a wide-angle image to be extracted from the source image at the first time point.

Specifically, for yet another example, the factor of enlargement is the upper-limit factor of enlargement determined as the upper limit of the ratio of the number of pixels of the narrow-angle high-resolution image to the number of pixels of the narrow-angle image, and the resolution enhancement processing portion is so configured as to be able to increase the ratio of the number of pixels of the narrow-angle high-resolution image to the number of pixels of the narrow-angle image up to the upper-limit factor of enlargement.

The significance and benefits of the invention will be clear from the following description of its embodiments. It should however be understood that these embodiments are merely examples of how the invention is implemented, and that the meanings of the terms used to describe the invention and its features are not limited to the specific ones in which they are used in the description of the embodiments.

DETAILED DESCRIPTION OF PREFERRED EMBODIMENTS

Embodiments of the present invention will be described below specifically with reference to the accompanying drawings. Among the different drawings referred to in the course of description, the same parts are identified by common reference signs and in principle no overlapping description of the same parts will be repeated.

Figure 1:
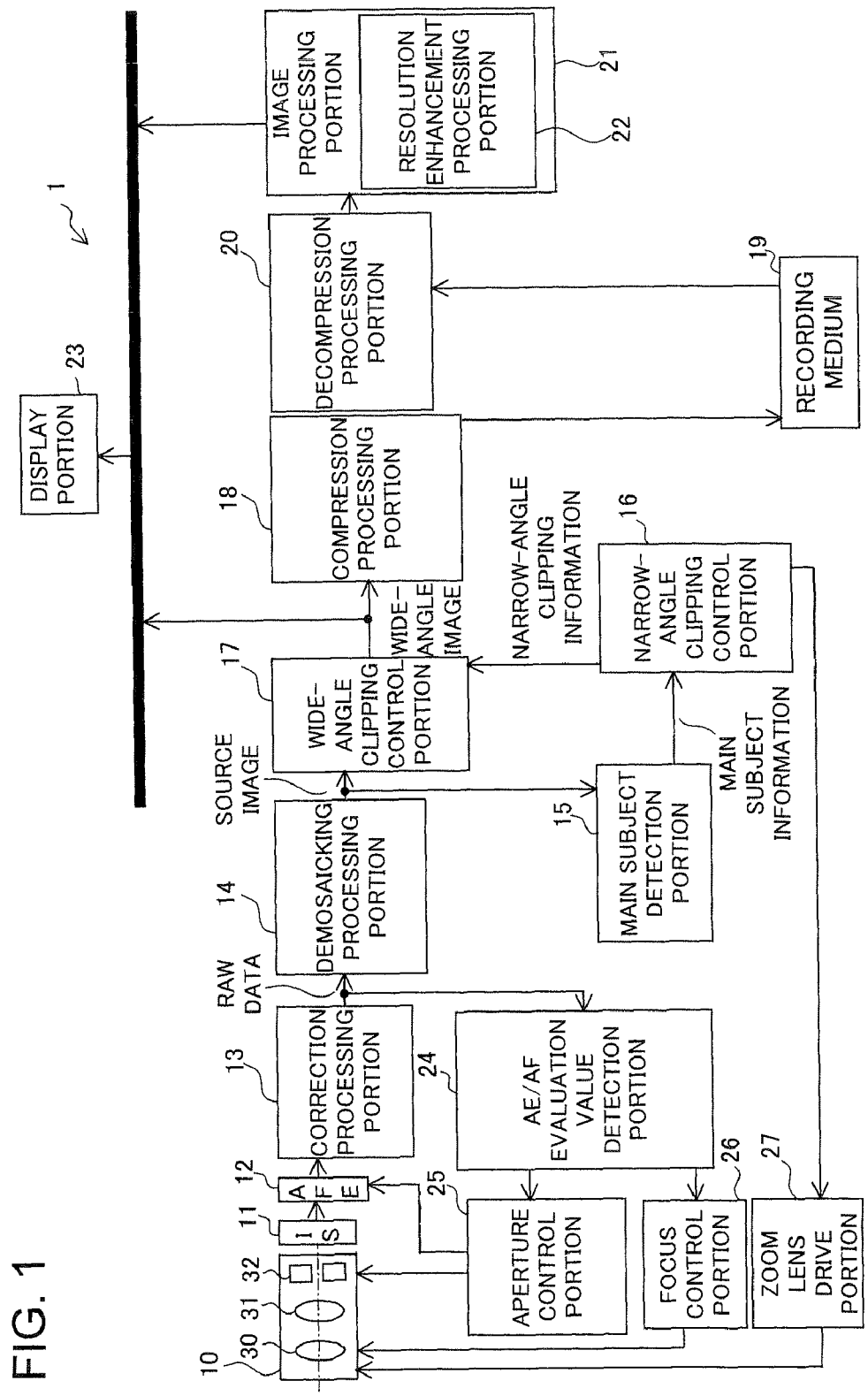
FIG. 1 is an overall block diagram of an image-sensing apparatus embodying the invention.

FIG. 1 is an overall block diagram of an image-sensing apparatus 1 embodying the invention. The image-sensing apparatus 1 is a digital video camera capable of shooting and recording still and moving images (pictures and movies). It should be understood that "image shooting" and "image sensing" are synonymous.

The image-sensing apparatus 1 is provided with parts identified by the reference signs 10 to 27. An optical system 10 is composed of a plurality of lenses—including a zoom lens 30 and a focus lens 31—and an aperture stop 32. The zoom lens 30 and the focus lens 31 are arranged in the optical system 10 to be movable along the optical axis of the optical system 10. In this embodiment, a display portion 23 is assumed to be provided within the image-sensing apparatus 1. The display portion 23, however, may instead be a display device provided externally to the image-sensing apparatus 1.

An image sensor 11 is a solid-state image-sensing device such as a CCD (charge-coupled device) or CMOS (complementary metal oxide semiconductor) image sensor. The image sensor 11 photoelectrically converts the optical image (subject image)—representing a subject—falling on it through the lenses (including the lenses 30 and 31) and the aperture stop 32 provided in the optical system 10, and feeds the resulting electrical signal to an AFE 12. More specifically, the image sensor 11 is provided with a plurality of light-receiving pixels arrayed in a two-dimensional matrix. Every time an image is shot, each light-receiving pixel accumulates an amount of electric charge—called signal electric charge—commensurate with the length of time of its exposure. An analog signal—having a magnitude proportional to the amount of electric charge thus accumulated as signal electric charge—from one pixel after another is sequentially, in synchronism with a drive pulse generated within the image-sensing apparatus 1, outputted to the AFE 12.

The AFE (analog front end) 12 amplifies the analog signal outputted from the image sensor 11, converts the amplified analog signal into a digital signal, and feeds this digital signal to a correction processing portion 13. The correction processing portion 13 subjects the output signal of the AFE 12 to various kinds of processing to be performed on it, and outputs the processed signal. For example, the correction processing portion 13 subjects the output signal of the AFE 12 to predetermined lens distortion correction to accommodate the lens characteristics of the optical system 10, and to pixel defect correction to cope with defective light-receiving pixels that the image sensor 11 may include. The output signal of the correction processing portion 13 is also called RAW data.

The image sensor 11 is an image sensor of a so-called single-panel type. Accordingly, in front of each light-receiving pixel of the single-panel image sensor provided as the image sensor 11, there is disposed either a red filter that transmits only a red component of light, a green filter that transmits only a green component of light, or a blue filter that transmits only a blue component of light. The red, green, and blue filters are arranged in a Bayer array. Thus, in the two-dimensional image represented by the RAW data, red color signals are arranged in a Bayer array, in a mosaic pattern (the same is true with green, and blue, color signals).

A demosaicking processing portion 14 subjects the RAW data to well-known demosaicking processing to generate image data in an RGB or YUV format. The two-dimensional image represented by the image data generated by the demosaicking processing portion 14 will hereinafter be called the source image. Each of the pixels forming the source image is assigned either a complete set of R, G, and B signals which represent the intensity of red, green, and blue, respectively, at that pixel, or a complete set of Y, U, and V signals. With respect to a given pixel, its R, G, and B signals are color signals representing the intensity of red, green, and blue, respectively, at that pixel. A Y signal is a luminance signal, and U and V signals are color difference signals.

Based on the image data of the source image, a main subject detection portion 15 detects the position and size of a main subject on the source image. In this embodiment, a main subject is set by a face detection function. Specifically, based on the image data of the source image, the main subject detection portion 15 detects a human face from the source image, and extracts a face region including the detected face. The processing for realizing that is called face detection processing. There have been known various techniques for detecting a face included in an image, and the main subject detection portion 15 may adopt any of those techniques. For example, a face (face region) may be detected by extracting a skin-colored region from a source image as by the technique disclosed in JP-A-2000-105819; or a face (face region) may be detected by the technique disclosed in JP-A-2006-211139 or JP-A-2006-72770.

After extracting the face region from the source image, the main subject detection portion 15 extracts from the source image a body region, which is a region including the body of the person corresponding to the face region. Taken as the body region is a region adjacent to the face region below it (in the direction pointing from the middle of the eyebrows to the mouth). The size of the body region is determined according to the size of the face region. Then, a rectangular region including the face region and the body region is set as a main subject region. In a case where a plurality of face regions are detected from a single source image, the face region whose center position is closest to the center of the source image is selected, and a rectangular region including the selected face region and a body region corresponding to the selected face region is set as a main subject region.

Figure 2:
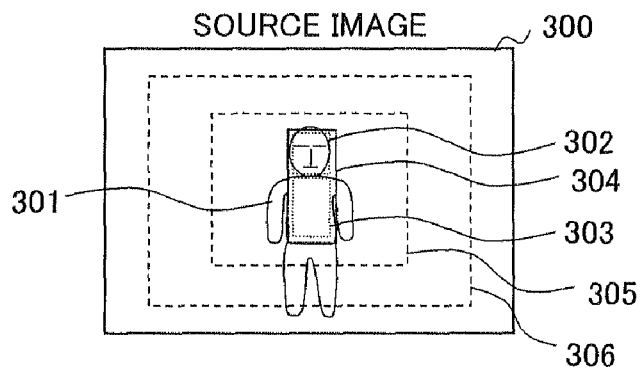
FIG. 2 is a diagram showing a source image obtained by shooting and a main subject on it, along with a face region, a body region, a main subject region, a narrow-angle clipping region, and a wide-angle clipping region set on the source image.

FIG. 2 shows an image 300 as an example of the source image. In FIG. 2, the person indicated by the reference sign 301 is the main subject on the source image 300. The broken-line rectangular region 302 is the face region of the main subject 301; the broken-line rectangular region 303 adjacent to the face region 302 below it is the body region of the main subject 301. The solid-line rectangular region 304 corresponding to the face region 302 and the body region 303 put together is the main subject region of the source image 300.

The main subject detection portion 15 detects, for example, the center position of the main subject region 304 as the position of the main subject on the source image 300 and the size of the main subject region 304 as the size of the main subject on the source image 300. The main subject detection portion 15 then generates main subject information indicating the center position and size of the main subject region.

Based on the main subject information, a narrow-angle clipping control portion 16 sets within the entire image region of the source image a narrow-angle clipping region including the main subject region. It then generates narrow-angle clipping information indicating the position and size of the narrow-angle clipping region on the source image. Based on the narrow-angle clipping information, a wide-angle clipping control portion 17 sets within the entire image region of the source image a wide-angle clipping region including the narrow-angle clipping region, and cuts out (extract) from the source image the image inside the wide-angle clipping region.

In FIG. 2, the broken-line rectangular region 305 is the narrow-angle clipping region set with respect to the source image 300. For example, the center position of the narrow-angle clipping region 305 on the source image 300 is set to be identical with the center position of the main subject region 304. The size of the narrow-angle clipping region 305 increases as the size of the main subject region 304 increases, and the former decreases as the latter decreases. As the size of the main subject 301 on the source image 300 increases, the sizes (numbers of pixels) of the face region 302, the body region 303, and the main subject region 304 increase and, as the former decreases, the latter decrease. Thus, as the size of the main subject on the source image 300 increases or decreases, in a manner interlocked with that, the size of the narrow-angle clipping region 305 increases or decreases.

In FIG. 2, the broken-line rectangular region 306 is the wide-angle clipping region set with respect to the source image 300. The center position of the wide-angle clipping region 306 on the source image 300 is determined relative to the center position of the narrow-angle clipping region 305 on the source image 300. If possible, for example, the center position of the narrow-angle clipping region 305 is made identical with the center position of the wide-angle clipping region 306.

The image inside the narrow-angle clipping region (more precisely, the image whose border coincides with the border of the narrow-angle clipping region) is called the narrow-angle image, and the image inside the wide-angle clipping region (more precisely, the image whose border coincides with the border of the wide-angle clipping region) is called the wide-angle image. While the method for setting the size of the wide-angle clipping region will be described in detail later, the size of the wide-angle clipping region (the region 306 in the example in FIG. 2) is always larger than the size of the narrow-angle clipping region (the region 305 in the example in FIG. 2). Accordingly, when the wide-angle and narrow-angle images cut out from a single source image are compared, the angle of view (field of view) of the former is lager than that of the latter (in other words, the size of the former is larger than that of the latter).

In the following description, for the sake of convenience, the reference signs 305 and 306 indicating the narrow-angle and wide-angle clipping regions with respect to the source image 300 in FIG. 2 are used as the reference signs indicating the narrow-angle and wide-angle images cut out from the source image 300 as well. The same is true with any other source image mentioned later.

A compression processing portion 18 compresses the image data of the wide-angle image by a predetermined compression method. A recording medium 19 is composed of a nonvolatile memory such as an SD (Secure Digital) memory card, and the image data of the wide-angle image compressed by the compression processing portion 18 is recorded to it. When this is done, the image data of the wide-angle image is recorded in association with narrow-angle clipping information. With respect to the source image 300 in FIG. 2, narrow-angle clipping information on the narrow-angle image 305 is recorded in association with the image data of the wide-angle image 306. Thus, the image data of the wide-angle image 306 can be generated from the data recorded on the recording medium 19, and the image data of the narrow-angle image 305 can be generated from the image data of the wide-angle image 306 and the recorded narrow-angle clipping information. The RAW data may also be recorded to the recording medium 19. A decompression processing portion 20 decompresses the compressed image data recorded on the recording medium 19, and feeds the decompressed image data to an image processing portion 21.

The image sensor 11 can perform shooting sequentially with a predetermined frame period, and such sequential shooting yields a sequence of source images. A sequence of source images is a group of chronologically ordered source images. Suppose a sequence of source images consists of source images of a first, a second, a third, . . . , an ith, an (i+1)th, . . . frames, and assume the source image of the ith frame is shot subsequently to the source image of the (i−1)th frame (where i is an integer). The wide-angle and narrow-angle images to be extracted from the source image of the ith frame will be called the wide-angle and narrow-angle images, respectively, of the ith frame.

At the time of shooting and recording of images, with respect to each source image, main subject information, narrow-angle clipping information, and a wide-angle image are generated. Accordingly, based on the image data of the source image of the ith frame, the position and size of the main subject on the source image of the ith frame are detected to generate the main subject information on the ith frame and then, based on the main subject information on the ith frame, the narrow-angle clipping information on the ith frame is generated. Based on the narrow-angle clipping information on the ith frame, the wide-angle image of the ith frame is extracted from the source image of the ith frame, and then the image data of the wide-angle image of the ith frame is, after undergoing compression processing, recorded along with the narrow-angle clipping information on the ith frame to the recording medium 19.

At the time of playback from image data, the compressed image data of the wide-angle images of the first to ith frames is sequentially read from the recording medium 19 and decompressed, so that the image data of the wide-angle images of the first to ith frames is fed, along with the narrow-angle clipping information on the first to ith frames, to the image processing portion 21.

The image processing portion 21 can feed the image data of the wide-angle images of the first to ith frames as it is to the display portion 23, which is composed of a liquid crystal display or the like, so that a moving image consisting of the wide-angle images of the first to ith frames may be displayed on the display portion 23. It can also cut out the narrow-angle images of the first to ith frames from the wide-angle images of the first to ith frames according to the narrow-angle clipping information on the first to ith frames so that a moving image consisting of the narrow-angle images of the first to ith frames may be displayed on the display portion 23.

Moreover, the image processing portion 21 is provided with a resolution enhancement processing portion 22, by use of which it can playback and display a moving image of narrow-angle images with high resolution. The resolution enhancement processing portion 22 is so configured that it can perform super-resolution processing (resolution enhancement processing) whereby a single high-resolution image is generated from m low-resolution images; using m narrow-angle images as m low-resolution images, it generates a single narrow-angle image with high resolution (hereinafter referred to as a narrow-angle high-resolution image). Here, m is an integer of 2 or more. The resolution enhancement processing portion 22 can adopt any known super-resolution processing. It can adopt, for example, any of the super-resolution processing methods disclosed in JP-A-2005-197910, JP-A-2007-205, JP-A-2007-193508, etc.

Figure 3:
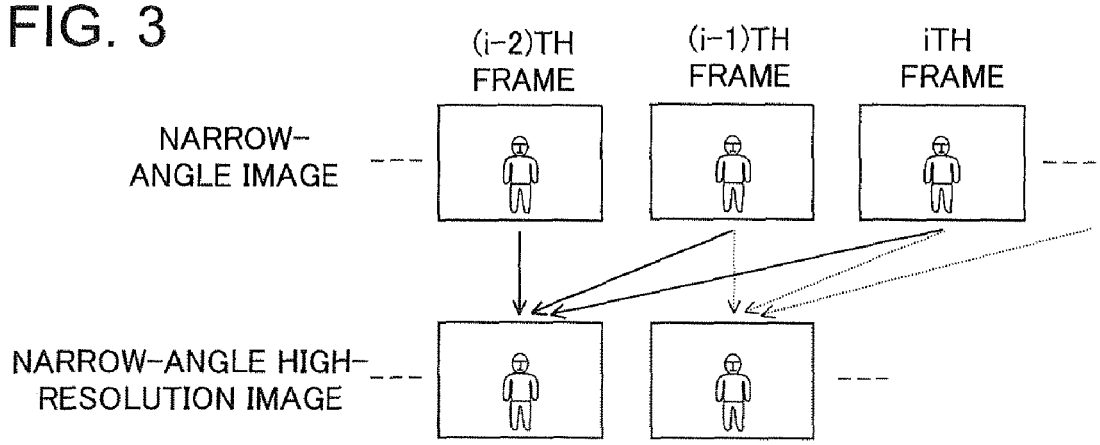
FIG. 3 is a diagram illustrating the super-resolution processing by the resolution enhancement processing portion in FIG. 1.

Now, with reference to FIG. 3, a description will be given of super-resolution processing in a case where m=3. To perform super-resolution processing, the resolution enhancement processing portion 22 handles the narrow-angle images of the (i−2)th, (i−1)th, and ith frames as a first, a second, and a third observed low-resolution images respectively. As will be clear from the foregoing, it is possible to cut out the narrow-angle images of the (i−2)th, (i−1)th, and ith frames from the wide-angle images of the (i−2)th, (i−1)th, and ith frames according to the narrow-angle clipping information on the (i−2)th, (i−1)th, and ith frames recorded on the recording medium 19.

Taking the first observed low-resolution image as a reference, the resolution enhancement processing portion 22 detects the amount of displacement between the first and second observed low-resolution images and the amount of displacement between the first and third observed low-resolution images. An amount of displacement is a two-dimensional quantity containing a horizontal and a vertical component, and is also called an amount of movement or a motion vector. An amount of displacement is so detected as to have a sub-pixel resolution, as by a representative matching method, a block matching method, a gradient method, etc. That is, an amount of displacement is detected in a minimum detection unit of a distance shorter than the intervals between adjacent pixels in the observed low-resolution image.

On the other hand, by linear interpolation or bicubic interpolation, the number of pixels of the first observed low-resolution image is increased horizontally and vertically to generate an initial high-resolution image. The generated high-resolution image will hereafter be gradually updated so as to be optimized. Specifically, using the detected amounts of displacement mentioned above, the resolution enhancement processing portion 22 estimates three low-resolution images that build the current high-resolution image, and continues to update the high-resolution image in such a way as to minimize the errors between the estimated low-resolution images and the observed low-resolution images. The ultimately obtained high-resolution image corresponds to the narrow-angle high-resolution image in the (i−2)th frame. The resolution of the other narrow-angle images is enhanced likewise. For example, based on the narrow-angle images of the (i−1)

th, ith, and (i+1)th frames, the narrow-angle high-resolution image in the (i−1)th frame is generated.

By feeding the image data of the narrow-angle high-resolution images of the first to ith frames generated by super-resolution processing to the display portion 23, it is possible to display a moving image consisting of the narrow-angle high-resolution images of the first to ith frames on the display portion 23.

At the time of shooting, the image data of the source image outputted from the demosaicking processing portion 14 may be fed to the display portion 23 so that a moving or still image based on the source image may be displayed on the display portion 23. Likewise, at the time of shooting, the image data of the wide-angle image outputted from the wide-angle clipping control portion 17 may be fed to the display portion 23 so that a moving or still image based on the wide-angle image may be displayed on the display portion 23. Instead, at the time of shooting, the image data of the narrow-angle image may be extracted from the image data of the wide-angle image and the narrow-angle clipping information and fed to the display portion 23 so that a moving or still image based on the narrow-angle image may be displayed on the display portion 23.

The image displayed on the display portion 23 will hereinafter be called the display image. For example, in a case where a moving image consisting of the narrow-angle high-resolution images of the first to ith frames is displayed on the display portion 23, the display image is a narrow-angle high-resolution image.

An AE/AF evaluation value detection portion 24 calculates from the RAW data an AE evaluation value commensurate with the lightness of the shot image, and also calculates from the RAW data an AF evaluation value for automatic focusing (AE stands for automatic exposure, and AF stands for automatic focusing). Based on the AE evaluation value, an aperture control portion 25 controls the aperture (i.e., aperture value) of the aperture stop 32 and the amplification factor of the signal amplification by the AFE 12 so that the source image has desired lightness. Based on the AF evaluation value, a focus control portion 26 controls the position of the focus lens 31 to achieve automatic focusing control using a TTL (through-the-lens) contrast detection method.

According to instructions from the user, or under the control of the narrow-angle clipping control portion 16, a zoom lens drive portion 27 controls the position of the zoom lens 30 to adjust the focal length of the optical system 10, thereby to achieve optical zooming. How the narrow-angle clipping control portion 16 controls the position of the zoom lens 30 will be described later.

Figure 4:
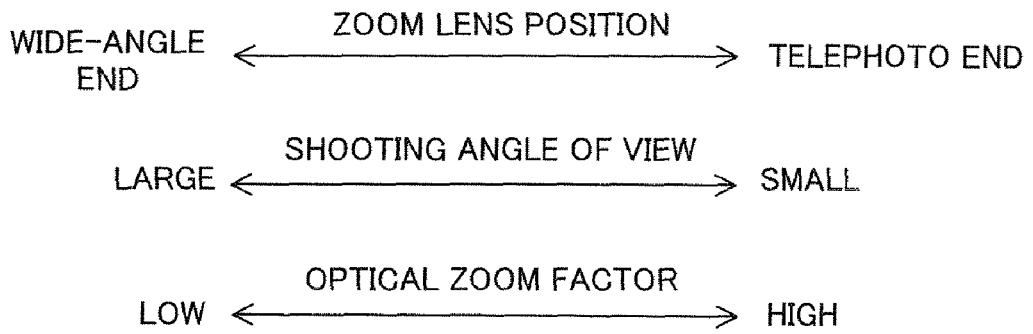
FIG. 4 is a diagram showing the relationship among zoom lens position, shooting angle of view, and optical zoom factor.
Figure 5:
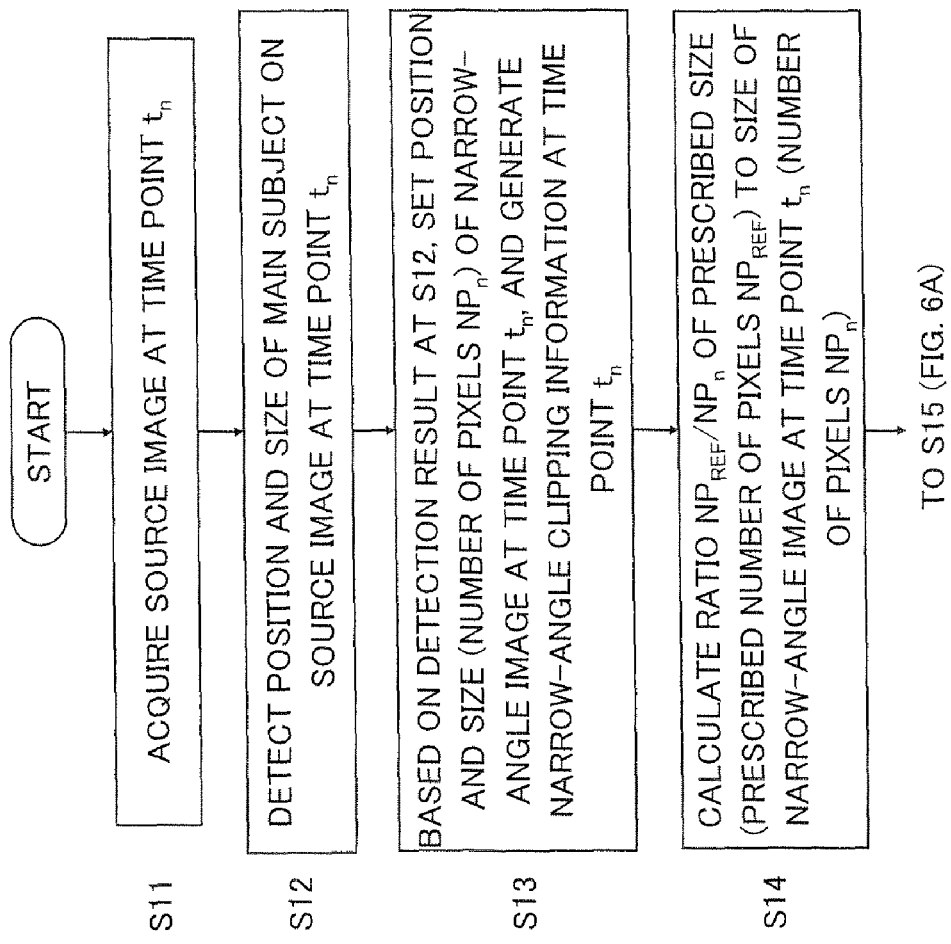
FIG. 5 is a flow chart showing the flow of the moving-image shooting operation by the image-sensing apparatus of FIG. 1.

A shown in FIG. 4, the zoom lens 30 is movable between a wide-angle end and a telephoto end. The wide-angle and telephoto ends are the opposite ends of the entire movement stroke of the zoom lens 30. As the zoom lens 30 moves from the wide-angle end to the telephoto end, the angle of view shot by the image sensor 11 (i.e., the angle of view of the source image) decreases and simultaneously the optical zoom factor increases. The optical zoom factor can be varied between a predetermined lower-limit factor to a predetermined upper-limit factor. When the zoom lens 30 is at the wide-angle end, the optical zoom factor is equal to the lower-limit factor; when the zoom lens 30 is at the telephoto end, the optical zoom factor is equal to the upper-limit factor. Provided that the subject distance of the main subject is constant, increasing the optical zoom factor causes the size of the main subject on the source image to increase, and decreasing the optical zoom factor causes the size of the main subject on the source image to decrease. The subject distance of the main subject denotes the distance from the image-sensing apparatus 1 to the main subject in the real space.

The size of an image, and the size of a region in an image, is expressed in terms of number of pixels. Representing the size of an image of interest, the number of pixels of the image of interest is the total number of pixels forming it. Likewise, representing the size of a region of interest, the number of pixels of the region of interest is the total number of pixels forming it. An image of interest may be any image taken up for discussion, such as a source image, wide-angle image, narrow-angle image, narrow-angle high-resolution image, etc. A region of interest may be any region taken up for discussion, such as a face region, body region, main subject region, wide-angle clipping region, narrow-angle clipping region, etc. If an image of interest or region of interest has a rectangular border, the number of pixels in it equals the horizontal number of pixels multiplied by the vertical number of pixels in the image or region of interest. In the following description, the number of pixels of a rectangular image or region of interest may be expressed as $(P_H \times P_V)$. Here, $P_H$ and $P_V$ represent the horizontal and vertical numbers, respectively, of pixels in the image or region of interest. For example, when the horizontal and vertical numbers of pixels in an image of interest are 1280 and 720 respectively, the number of pixels of the image of interest is expressed as (1280×720).

As described previously, through the super-resolution processing by the resolution enhancement processing portion 22, a narrow-angle high-resolution image having a resolution higher than that of a narrow-angle image is generated. Specifically, let the number of pixels of the narrow-angle image be $(L_H \times L_V)$, and let the number of pixels of the narrow-angle high-resolution image generated from the narrow-angle image with a number of pixels of $(L_H \times L_V)$ be $(H_H \times H_V)$; then the following relationships hold: $L_H < H_H$ and simultaneously $L_V <$ Hv. Here, the relationship $L_H:L_V \neq H_H:H_V$ can also hold but, for the sake of simplicity, the following description assumes that $L_H:L_V = H_H:H_V$. The symbol EL$=(H_H \times H_V)/(L_H \times L_V)$ represents the factor of enlargement at which the number of pixels of the narrow-angle high-resolution image has been increased compared with the number of pixels of the narrow-angle image. There is an upper limit on this factor of enlargement EL. This upper limit is called the upper-limit enlargement factor $EL_{MAX}$. The upper-limit enlargement factor $EL_{MAX}$ is previously determined according to the performance of the super-resolution processing by the resolution enhancement processing portion 22. The resolution enhancement processing portion 22 can perform super-resolution processing with the factor of enlargement EL arbitrarily set within the range fulfilling $1 < EL \leq EL_{MAX}$.

In the following description, for the sake of concreteness, it is assumed that the upper-limit enlargement factor $EL_{MAX}$ is 4.0. Accordingly, for example, the maximum number of pixels of a narrow-angle high-resolution image that can be generated from a narrow-angle image with a number of pixels of (640×360) is (1280×720).

When the image-sensing apparatus 1 is provided with a function of generating a narrow-angle high-resolution image as described above, at the time of shooting, once a main subject is caught within the shooting angle of view, the user can view a high-definition image (narrow-angle high-resolution image) in which the main subject appears relatively large. Moreover, the image data of a wide-angle image is recorded to the recording medium 19, and thus the user can also view an image with a wide angle of view. Since there is an upper limit on the factor of enlargement EL of super-resolution processing, however, with that taken into consideration it is necessary to control the clipping of the wide-angle image and to control the optical zoom factor. A description will now be given of such control with consideration given to the upper limit of the factor of enlargement EL.

In the following description, it is assumed that the number of pixels of the wide-angle image to be recorded to the recording medium 19 is previously determined to be equal to a prescribed number of pixels $NP_{REF}$ and, for the sake of concreteness, it is assumed that the prescribed number of pixels $NP_{REF}$ equals (1280×720). The user can specify the prescribed number of pixels $NP_{REF}$. It is also assumed that the number of pixels of the display image outputted from the image processing portion 21 to the display portion 23 at the time of image playback is previously determined to be equal to the prescribed number of pixels $NP_{REF}$. The following description assumes that super-resolution processing is performed at the time of image playback. Accordingly, the display image at the time of image playback is a narrow-angle high-resolution image based on the wide-angle image recorded on the recording medium 19. It is further assumed that the number of pixels of the source image is (1600×1200). In addition, it is assumed that in all of the wide-angle image, the narrow-angle image, and the narrow-angle high-resolution image, the ratio of the horizontal number of pixels to the vertical number of pixels is 16:9.

Since the prescribed number of pixels $NP_{REF}$ is (1280×720) and the upper-limit enlargement factor $EL_{MAX}$ is 4, it is preferable that the number of pixels of the narrow-angle image as determined according to the narrow-angle clipping information be (640×360). The reason is as follows.

In a case where the number of pixels of the narrow-angle image as determined according to the narrow-angle clipping information is smaller than (640×360), specifically (480×270) for instance, even at the upper-limit enlargement factor $EL_{MAX}$, the number of pixels of the narrow-angle high-resolution image is no more than (960×540). Thus, to generate the display image, the number of pixels of the narrow-angle high-resolution image needs to be increased from (960×540) to (1280×720) by simple electronic zooming. Here, electronic zooming denotes resolution conversion whereby, based on the image data of a single image of interest, the number of pixels of the image of interest is increased through interpolation processing. Electronic zooming-based resolution conversion brings degraded image quality and should better be avoided.

In contrast, in a case where the number of pixels of the narrow-angle image as determined according to the narrow-angle clipping information is larger than (640×360), specifically (960×540) for instance, to generate a display image with a number of pixels of (1280×720), the factor of enlargement EL of super-resolution processing needs to be set at (1280×720)/(960×540), which is smaller than the upper-limit enlargement factor $EL_{MAX}$. When the factor of enlargement EL of super-resolution is set smaller than the upper-limit enlargement factor $EL_{MAX}$, the effect of super-resolution processing is not maximized. Ultimately, for example, when the number of pixels of the narrow-angle image is (1279×719), there is hardly any difference in number of pixels between the narrow-angle image and the narrow-angle high-resolution image, and thus generating a narrow-angle high-resolution image from such a narrow-angle image gives hardly any resolution-enhancing effect.

In light of the foregoing, it is most preferable that the number of pixels of the narrow-angle image as determined according to the narrow-angle clipping information be (640×360).

Operation at the Time of Shooting

From the perspective discussed above, the narrow-angle clipping control portion 16 adjusts the optical zoom factor by controlling the zoom lens drive portion 27 such that the number of pixels of the narrow-angle image as determined according to the narrow-angle clipping information is as close as possible to a number of pixels of (640×360). The flow of the operation, including the operation for such adjustment of the optical zoom factor, performed by the image-sensing apparatus 1 when shooting a moving image will now be described with reference to FIGS. 5 and 6A to 6D. FIGS. 5 and 6A to 6D are flow charts showing the flow of moving-image shooting operation.

FIGS. 5 and 6A to 6D show the processing performed on a source image obtained by shooting at a given time point $t_n$. Time point $t_{n+1}$ occurs later than time point $t_n$. The source image obtained by shooting at time point $t_n$ will be called the source image at time point $t_n$, and the narrow-angle and wide-angle images based on the source image at time point $t_n$ will be called the narrow-angle and wide-angle images at time point $t_n$ respectively. Likewise, the source image obtained by shooting at time point $t_{n+1}$ will be called the source image at time point $t_{n+1}$, and the narrow-angle and wide-angle images based on the source image at time point $t_{n+1}$ will be called the narrow-angle and wide-angle images at time point $t_{n+1}$ respectively. The same applies to the succeeding time points $t_{+2}$ etc.

First, at step S11, by shooting at time point $t_n$ by the image sensor 11, the source image at time point $t_n$ is acquired. At step S12, the main subject detection portion 15 detects the position and size of the main subject on the source image at time point $t_n$, and generates the main subject information with respect to the source image at time point $t_n$.

Subsequently, at step S13, based on the result of the detection in step S12, that is, based on the main subject information with respect to the source image at time point $t_n$, the narrow-angle clipping control portion 16 sets a narrow-angle clipping region including a main subject region within the entire image region of the source image at time point $t_n$, thereby setting the position and size of the narrow-angle image at time point $t_n$ and generating the narrow-angle clipping information at time point $t_n$. According to the narrow-angle clipping information at time point $t_n$ generated at step S13, the position and size of the narrow-angle image (the position and size of the narrow-angle clipping region) at time point $t_n$ on the source image at time point $t_n$ are specified. The number of pixels of the narrow-angle image at time point $t_n$ as determined according to the narrow-angle clipping information at time point $t_n$ generated at step S13 is represented by $NP_n$.

Thereafter, at step S14, based on the narrow-angle clipping information at time point $t_n$, the narrow-angle clipping control portion 16 finds the ratio of a prescribed size to the size of the narrow-angle image at time point $t_n$ (i.e., the number of pixels $NP_n$). Here, the prescribed size is the above-mentioned prescribed number of pixels $NP_{REF}$=(1280×720). Accordingly, the ratio found at step S14 is $NP_{REF}/NP_n$. On completion of the ratio calculating processing at step S14, an advance is made to step S15 (see FIG. 6A).

At step S15, the narrow-angle clipping control portion 16 checks whether or not the ratio $NP_{REF}/NP_n$ equals the upper-limit enlargement factor $EL_{MAX}$. If the equation "$NP_{REF}/NP_n=EL_{MAX}$" holds, an advance is made from step S15 to step S16; otherwise an advance is made from step S15 to step S19. At step S15, it may instead be checked whether or not the ratio $NP_{REF}/NP_n$ substantially equals the upper-limit enlargement factor $EL_{MAX}$. In that case, if the inequality "$EL_{MAX}-\Delta EL \leq NP_{REF}/NP_n \leq EL_{MAX}+\Delta EL$" holds, an advance is made from step S15 to step S16; if the inequality does not hold, an advance is made from step S15 to step S19. Here, ΔEL is a predetermined value fulfilling 0<ΔEL<$EL_{MAX}$, and is set at, for example, about a few tens.

Figure 7:
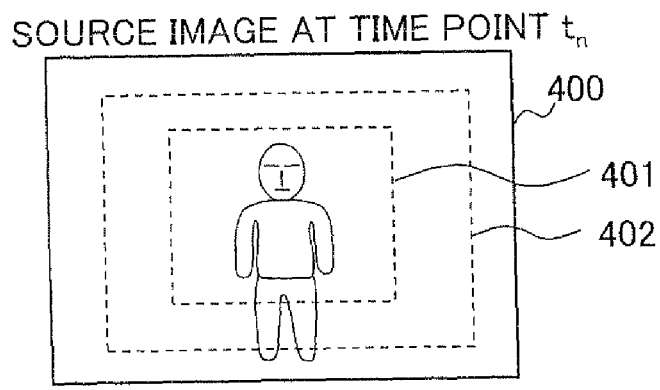
FIG. 7 is a diagram showing an example of a source image obtained when the subject distance of the main subject is medium.

In a case where an advance is made from step S15 to step S16, the processing at steps S16 through S18 is performed sequentially. The image 400 shown in FIG. 7 is an example of the source image at time point $t_n$ in the case where the processing at steps S16 through S18 is performed sequentially. In FIG. 7, the images inside broken-line rectangular regions 401 and 402 are the narrow-angle and wide-angle images, respectively, to be extracted from the source image 400.

At step S16, the narrow-angle clipping control portion 16 controls the zoom lens drive portion 27 such that the position of the zoom lens 30 does not change (i.e., the optical zoom factor does not change) between time points $t_n$ and $t_{n+1}$. Thus, the zoom lens 30 is kept at a fixed position between time points $t_n$ and $t_{n+1}$.

At step S17, based on the narrow-angle clipping information at time point $t_n$ generated at step S13, the wide-angle clipping control portion 17 cuts out, from the source image at time point $t_n$, an image that includes the narrow-angle image at time point $t_n$ set at step S13 and that has the prescribed size (i.e., the prescribed number of pixels $NP_{REF}$), as the wide-angle image at time point $t_n$. For example, in a case where the image 400 in FIG. 7 is acquired as the source image at time point $t_n$, and the image inside the broken-line rectangular region 401 is taken as the narrow-angle image at time point $t_n$, the image inside the broken-line rectangular region 402 is cut out as the wide-angle image at time point $t_n$.

Subsequently, at step S18, the image data of the wide-angle image at time point $t_n$ cut out at step S17 is, after undergoing compression processing by the compression processing portion 18, recorded to the recording medium 19. At this time, the narrow-angle clipping information at time point $t_n$ generated at step S13 also is, in association with the image data of the wide-angle image at time point $t_n$, recorded to the recording medium 19. The narrow-angle clipping information at time point $t_n$, however, is recorded to the recording medium 19 after being converted into information indicating the position and size of the narrow-angle image at time point $t_n$ on the wide-angle image at time point $t_n$.

By contrast, in a case where an advance is made from step S15 to step S19, first, at step S19, the narrow-angle clipping control portion 16 checks whether or not the inequality "$NP_{REF}/NP_n > EL_{MAX}$" holds. If, at step S19, the inequality "$NP_{REF}/NP_n > EL_{MAX}$" holds, an advance is made from step S19 to step S20; if the inequality "$NP_{REF}/NP_n > EL_{MAX}$" does not hold, an advance is made from step S19 to step S24.

Figure 8:
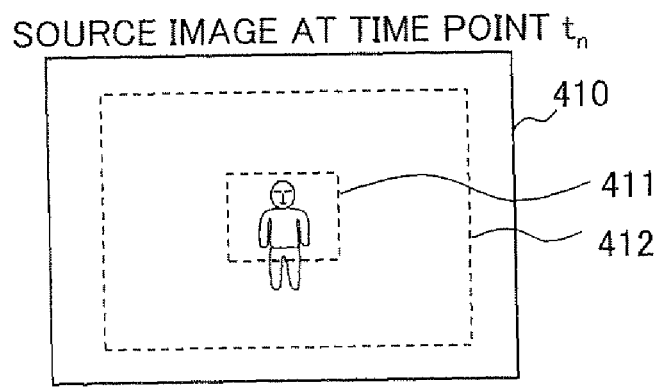
FIG. 8 is a diagram showing an example of a source image obtained when the subject distance of the main subject is relatively long.

The image 410 shown in FIG. 8 is an example of the source image at time point $t_n$ in a case where the inequality "$NP_{REF}/NP_n > EL_{MAX}$" holds. In FIG. 8, the images inside broken-line rectangular regions 411 and 412 are the narrow-angle and wide-angle images, respectively, to be extracted from the source image 410. In the source image 410, due to, among others, a relatively large subject distance of the main subject, the size of the main subject on the image is comparatively small, and accordingly the size of the narrow-angle image is relatively small.

When a source image like the image 410 is acquired at time point $t_n$, an attempt is made to increase the optical zoom factor with a view to increasing the size of the main subject on the image. Specifically, at step S20, to which an advance is made from step S19 when inequality "$NP_{REF}/NP_n > EL_{MAX}$" holds, the narrow-angle clipping control portion 16 checks whether or not the optical zoom factor can be increased from its current setting. If the optical zoom factor $ZF_n$ at the time of shooting of the source image at time point $t_n$ is smaller than the upper-limit factor, the optical zoom factor can be increased; thus, an advance is made from step S20 to step S21, so that the processing at steps S21 through S23 is performed sequentially. By contrast, if the optical zoom factor $ZF_n$ at the time of shooting of the source image at time point $t_n$ is equal to the upper-limit factor, the optical zoom factor cannot be increased any more; thus, an advance is made from step S20 directly to step S22, so that, with the processing in step S21 omitted, the processing at steps S22 and S23 is performed sequentially.

At step S21, the narrow-angle clipping control portion 16 controls the zoom lens drive portion 27 to increase the optical zoom factor between time points $t_n$ and $t_{+1}$ such that the ratio $NP_{REF}/NP_{n+1}$ of the prescribed size (i.e., the prescribed number of pixels $NP_{REF}$) to the size of the narrow-angle image at time point $t_{n+1}$ (i.e., the number of pixels $NP_{n+1}$) equals the upper-limit enlargement factor $EL_{MAX}$, or such that the inequality "$(NP_{REF}/NP_n) - EL_{MAX} > (NP_{REF}/NP_{n+1}) - EL_{MAX}$" holds. That is, it controls it to increase the optical zoom factor between time points $t_n$ and $t_{n+1}$ such that, compared with the ratio $NP_{REF}/NP_n$, the ratio $NP_{REF}/NP_{n+1}$ is closer to the upper-limit enlargement factor $EL_{MAX}$.

This processing for increasing the optical zoom factor is performed on the assumption that the subject distance of the main subject does not change between time points $t_n$ and $t_{n+1}$. Accordingly, if, for the sake of discussion, the ratio $NP_{REF}/NP_n$ is four times the upper-limit enlargement factor $EL_{MAX}$, the optical zoom factor is increased between time points $t_n$ and $t_{n+1}$ such that the inequality "$ZF_n < ZF_{n+1} \leq ZF_n \times 2$" holds, and preferably such that the inequality "$ZF_{n+1} = ZF_n \times 2$" holds. The symbols $ZF_n$ and $ZF_{n+1}$ represent the optical zoom factor at the time of shooting of the source image at time points $t_n$ and $t_{n+1}$ respectively.

It is assumed that, in a case where the subject distance of the main subject actually does not change between times point $t_n$ and $t_{n+1}$, when the optical zoom factor $ZF_{n+1}$ is made equal to K times the optical zoom factor $ZF_n$, the horizontal and vertical dimensions of the main subject on the source image at time point $t_{n+1}$ become equal to K times those at time point $t_n$, and accordingly the horizontal and vertical dimensions of the narrow-angle image as set with respect to the source image at time point $t_{n+1}$ become equal to K times those at time point $t_n$ (in other words, the number of pixels $NP_{n+1}$ of the narrow-angle image set with respect to the source image at time point $t_{n+1}$ becomes $K^2$ times that (i.e., $NP_n$) at time point $t_n$). K represents an arbitrary integer or fraction.

The processing at steps S22 and S23 is the same as that at steps S17 and S18. Specifically, at step S22, based on the narrow-angle clipping information at time point $t_n$ generated at step S13, the wide-angle clipping control portion 17 cuts out, from the source image at time point $t_n$, an image that includes the narrow-angle image at time point $t_n$ set at step S13 and that has the prescribed size (i.e., the prescribed number of pixels $NP_{REF}$), as the wide-angle image at time point $t_n$. For example, in a case where the image 410 in FIG. 8 is acquired as the source image at time point $t_n$, and the image inside the broken-line rectangular region 411 is taken as the narrow-angle image at time point $t_n$, the image inside the broken-line rectangular region 412 is cut out as the wide-angle image at time point $t_n$.

Subsequently, at step S23, the image data of the wide-angle image at time point $t_n$ cut out at step S22 is, after undergoing compression processing by the compression processing portion 18, recorded to the recording medium 19. At this time, the narrow-angle clipping information at time point $t_n$ generated at step S13 also is, in association with the image data of the wide-angle image at time point $t_n$, recorded to the recording medium 19. The narrow-angle clipping information at time point $t_n$, however, is recorded to the recording medium 19 after being converted into information indicating the position and size of the narrow-angle image at time point $t_n$ on the wide-angle image at time point $t_n$.

Figure 9:
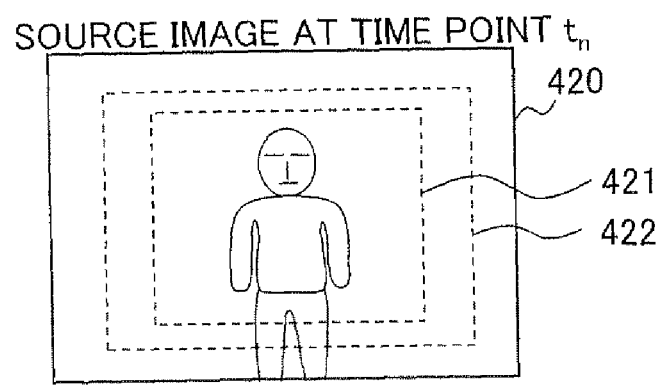
FIG. 9 is a diagram showing an example of a source image obtained when the subject distance of the main subject is relatively short.

The image 420 shown in FIG. 9 is an example of the source image at time point $t_n$ in a case where the inequality "$NP_{REF}/NP_n < EL_{MAX}$" holds. In FIG. 9, the images inside broken-line rectangular regions 421 and 422 are the narrow-angle and wide-angle images, respectively, to be extracted from the source image 420. In the source image 420, due to, among others, a relatively small subject distance of the main subject, the size of the main subject on the image is comparatively large, and accordingly the size of the narrow-angle image is relatively large.

When a source image like the image 420 is acquired at time point $t_n$, an attempt is made to decrease the optical zoom factor with a view to decreasing the size of the main subject on the image. Specifically, in a case where an advance has been made from step S19 to step S24, at step S24, the narrow-angle clipping control portion 16 checks whether or not the optical zoom factor can be decreased from its current setting. If the optical zoom factor $ZF_n$ at the time of shooting of the source image at time point $t_n$ is greater than the lower-limit factor, the optical zoom factor can be decreased; thus, an advance is made from step S24 to step S25, so that the processing at steps S25 through S27 is performed sequentially. By contrast, if the optical zoom factor $ZF_n$ at the time of shooting of the source image at time point $t_n$ is equal to the lower-limit factor, the optical zoom factor cannot be decreased any more; thus, an advance is made from step S24 directly to step S26, so that, with the processing in step S25 omitted, the processing at steps S26 and S27 is performed sequentially.

At step S25, the narrow-angle clipping control portion 16 controls the zoom lens drive portion 27 to decrease the optical zoom factor between time points $t_n$ and $t_{n+1}$ such that the ratio $NP_{REF}/NP_{n+1}$ of the prescribed size (i.e., the prescribed number of pixels $NP_{REF}$) to the size of the narrow-angle image at time point $t_{n+1}$ (i.e., the number of pixels equals the upper-limit enlargement factor $EL_{MAX}$, or such that the inequality "$EL_{MAX} - (NP_{REF}/NP_n) > EL_{MAX} - (NP_{REF}/NP_{n+1})$" holds. That is, it controls it to decrease the optical zoom factor between time points $t_n$ and $t_{n+1}$ such that, compared with the ratio $NP_{REF}/NP_n$, the ratio $NP_{REF}/NP_{n+1}$ is closer to the upper-limit enlargement factor $EL_{MAX}$.

This processing for decreasing the optical zoom factor is performed on the assumption that the subject distance of the main subject does not change between time points $t_n$ and $t_{n+1}$. Accordingly, if, for the sake of discussion, the ratio $NP_{REF}/NP_n$ is one-fourth of the upper-limit enlargement factor $EL_{MAX}$, the optical zoom factor is decreased between time points $t_n$ and $t_{n+1}$ such that the inequality "$ZF_n \times \frac{1}{2} \leq ZF_{n+1} < ZF_n$" holds, and preferably such that the inequality "$ZF_{n+1} = ZF_n \times \frac{1}{2}$" holds.

The processing at steps S26 and S27 is the same as that at steps S17 and S18. Specifically, at step S26, based on the narrow-angle clipping information at time point $t_n$ generated at step S13, the wide-angle clipping control portion 17 cuts out, from the source image at time point $t_n$, an image that includes the narrow-angle image at time point $t_n$ set at step S13 and that has the prescribed size (i.e., the prescribed number of pixels $NP_{REF}$), as the wide-angle image at time point $t_n$. For example, in a case where the image 420 in FIG. 9 is acquired as the source image at time point $t_n$, and the image inside the broken-line rectangular region 421 is taken as the narrow-angle image at time point $t_n$, the image inside the broken-line rectangular region 422 is cut out as the wide-angle image at time point $t_n$.

Subsequently, at step S27, the image data of the wide-angle image at time point $t_n$ cut out at step S26 is, after undergoing compression processing by the compression processing portion 18, recorded to the recording medium 19. At this time, the narrow-angle clipping information at time point $t_n$ generated at step S13 also is, in association with the image data of the wide-angle image at time point $t_n$, recorded to the recording medium 19. The narrow-angle clipping information at time point $t_n$, however, is recorded to the recording medium 19 after being converted into information indicating the position and size of the narrow-angle image at time point $t_n$ on the wide-angle image at time point $t_n$.

Figure 10:
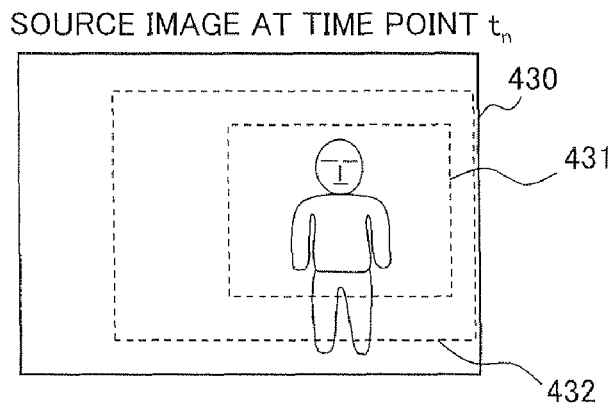
FIG. 10 is a diagram showing an example of a source image obtained by the image-sensing apparatus of FIG. 1.

At any of steps S17, S22, and S26, if possible, the wide-angle image at time point $t_n$ may be extracted such that the center positions of the narrow-angle and wide-angle images at time point $t_n$ coincide. The same applies to steps S31, S42, and S44 described later. If, for the sake of discussion, a source image like the image 430 in FIG. 10 is acquired as the source image at time point $t_n$, and the center positions of the narrow-angle and wide-angle images at time point $t_n$ cannot be made to coincide, the center position of the wide-angle image at time point $t_n$ may be shifted from the center position of the narrow-angle image at time point $t_n$ so that a wide-angle image at time point $t_n$ that includes the narrow-angle image at time point $t_n$ and that has the prescribed number of pixels $NP_{REF}$ can be extracted from the source image at time point $t_n$ (the same applies to steps S31, S42, and S44 described later). In FIG. 10, the images inside the broken-line rectangular regions 431 and 432 are the narrow-angle and wide-angle images, respectively, to be extracted from the source image 430.

After the batch of processing at steps S11 through S27 is performed with respect to time point $t_n$, then the batch of processing at steps S11 through S27 is performed with respect to time point $t_{n+1}$. When the batch of processing is performed with respect to time point $t_{n+1}$, the symbols "n" and "n+1" in the description of the batch of processing with respect to time point $t_n$ are read as "n+1" and "n+2" respectively. The same applies to the succeeding time points $t_{n+2}$ etc.

First Modified Operation

Figure 6A:
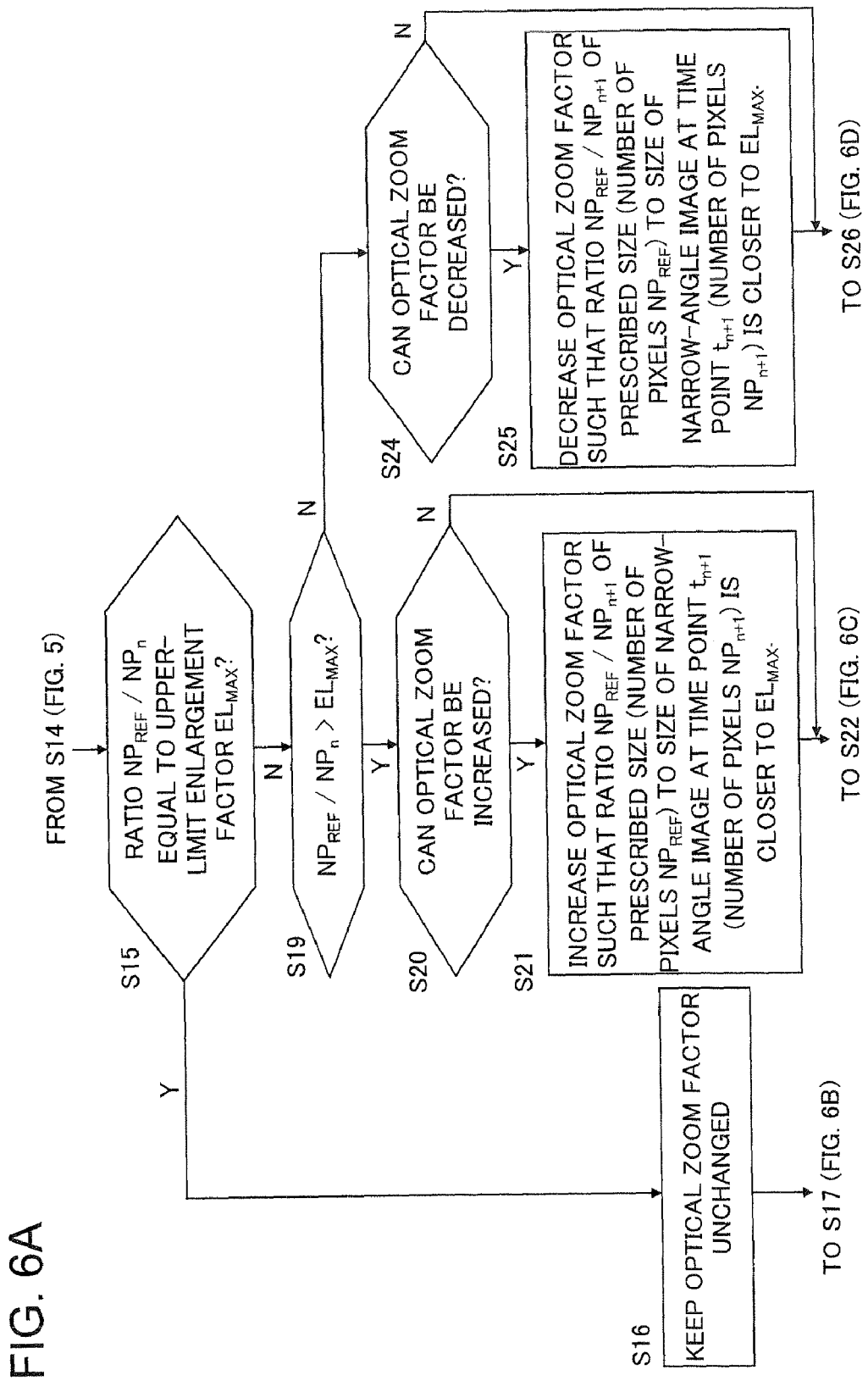
FIGS. 6A to 6D are flow charts showing the flow of the moving-image shooting operation by the image-sensing apparatus of FIG. 1.
Figure 6B:
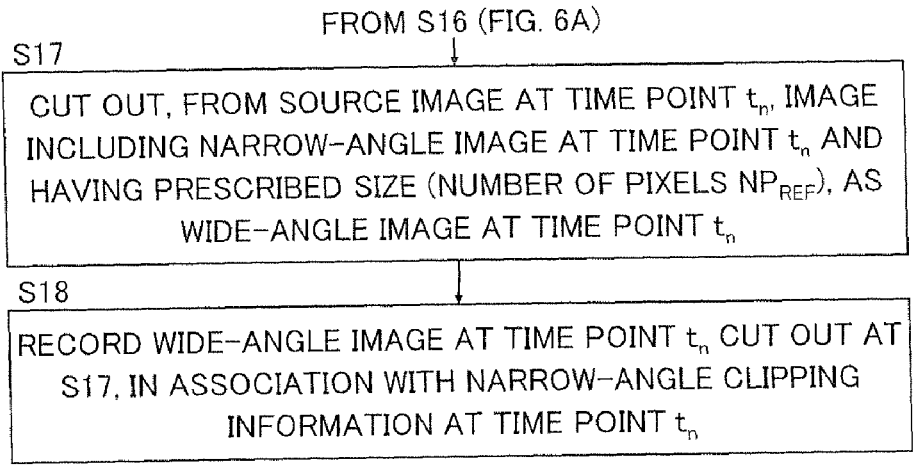
Figure 6C:
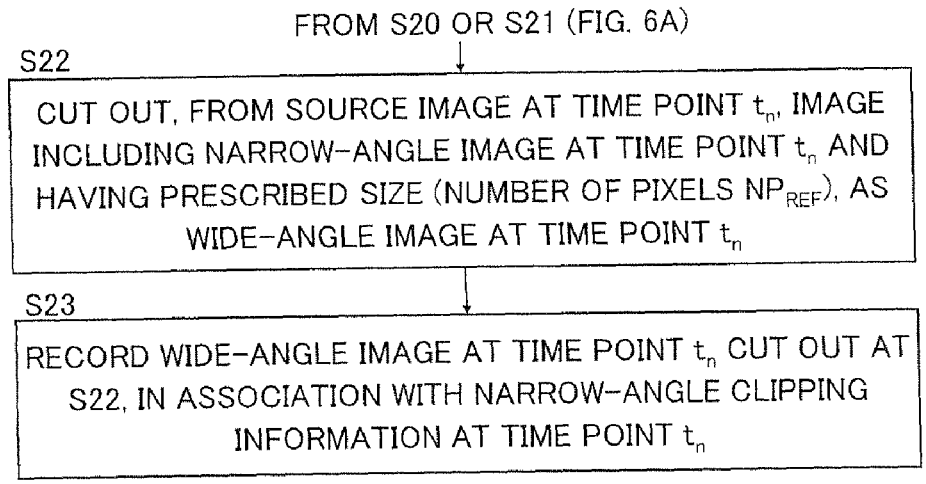
Figure 11:
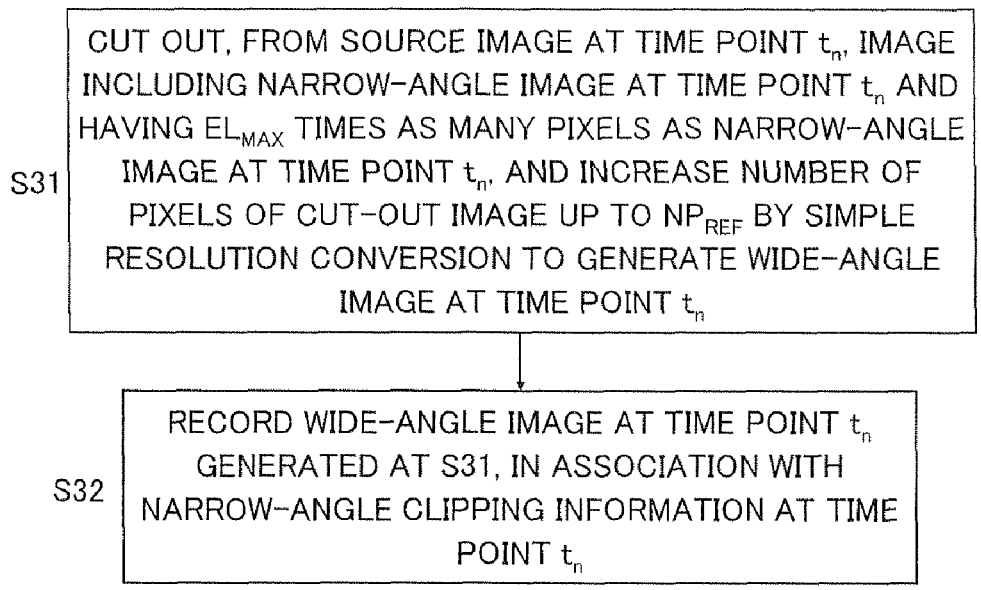
FIG. 11 is a flow chart showing the flow of the first modified operation for moving-image shooting.

The processing performed at steps S22 and S23 in FIG. 6C may be replaced with the processing at steps S31 and S32 shown in FIG. 11. Specifically, if, at step S20 in FIG. 6A, it is found that the optical zoom factor can be increased, then, on completion of the processing at step S21, instead of the processing at steps S22 and S23, the processing at steps S31 and S32 in FIG. 11 may be performed; if, at step S20 in FIG. 6A, it is found that the optical zoom factor cannot be increased, then, an advance may be made from step S20 to step S31 so that, instead of the processing at steps S22 and S23, the processing at steps S31 and S32 in FIG. 11 may be performed. The modified operation in which the processing at steps S31 and S32 is performed will be called the first modified operation. The first modified operation will now be described.

At step S31, based on the narrow-angle clipping information at time point $t_n$ generated at step S13, the wide-angle clipping control portion 17 cuts out, from the source image at time point $t_n$, an image that includes the narrow-angle image at time point $t_n$ set at step S13 and having a number of pixels equal to $EL_{MAX}$ times the number of pixels $NP_n$ of the narrow-angle image (i.e., $NP_n \times EL_{MAX}$). The image thus cut out will be called the first preliminary wide-angle image. When the processing at step S31 is performed, the ratio $NP_{REF}/NP_n$ is greater than the upper-limit enlargement factor $EL_{MAX}$, and accordingly the number of pixels of the first preliminary wide-angle image cut out at step S31 is smaller than the prescribed number of pixels $NP_{REF}$. The wide-angle clipping control portion 17 increases the number of pixels of the first preliminary wide-angle image up to the prescribed number of pixels $NP_{REF}$ by electronic zooming, and yields the image obtained by increasing the number of pixels of the first preliminary wide-angle image as the wide-angle image at time point $t_n$ to be extracted from the source image at time point $t_n$.

As described earlier, electronic zooming denotes resolution conversion whereby, based on the image data of a single image of interest, the number of pixels of the image of interest is increased through interpolation processing. In the following description, resolution conversion based on the image data of a single image as distinct from resolution conversion through super-resolution processing will be called simple resolution conversion. Resolution conversion whereby the number of pixels of an image of interest is reduced through thinning-out processing or interpolation processing also is called simple resolution conversion. In simple resolution conversion, any of various methods for interpolation processing such as a nearest neighbor method, a bilinear method, a bicubic method, etc. may be adopted.

Subsequently to step S31, at step S32, the image data of the wide-angle image at time point $t_n$ generated at step S31 is, after undergoing compression processing by the compression processing portion 18, recorded to the recording medium 19. At this time, the narrow-angle clipping information at time point $t_n$ generated at step S13 also is, in association with the image data of the wide-angle image at time point $t_n$, recorded to the recording medium 19. The narrow-angle clipping information at time point $t_n$, however, is recorded to the recording medium 19 after being converted into information indicating the position and size of the narrow-angle image at time point $t_n$ on the wide-angle image at time point $t_n$.

Figure 12:
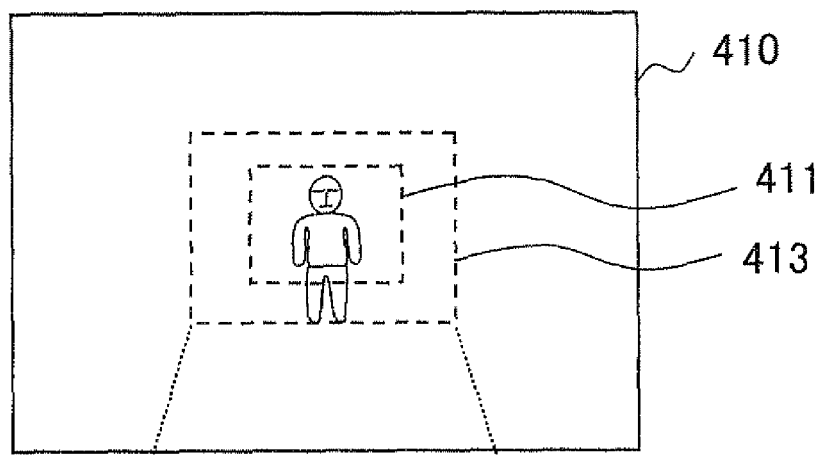
FIG. 12 is a diagram illustrating the first modified operation, showing how a wide-angle image is generated from a source image.
Figure 12:
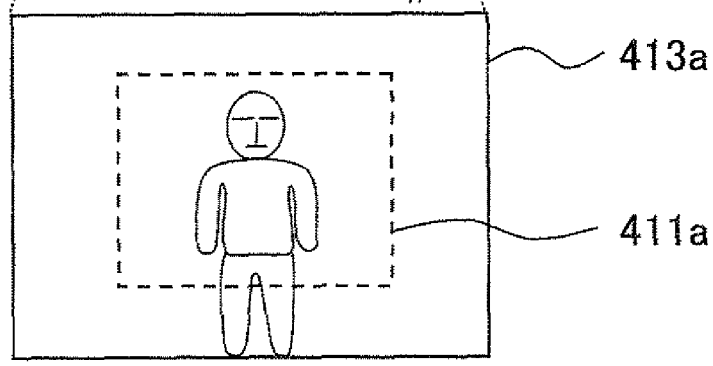

For example, in a case where a source image like the source image 410 shown in FIG. 12 is acquired at time point $t_n$ and then the processing at step S31 is performed, the images inside broken-line rectangular regions 411 and 413 are, as the narrow-angle image and the first preliminary wide-angle image respectively, from the source image 410. The source image 410 in FIG. 12 is the same as that in FIG. 8. In this case, the number of pixels of the first preliminary wide-angle image extracted from the source image 410 is increased up to the prescribed number of pixels $NP_{REF}$ by simple resolution conversion and thereby a wide-angle image 413a at time point $t_n$ having the prescribed number of pixels $NP_{REF}$ is generated; then the image data of the wide-angle image 413a at time point $t_n$ is, in association with the narrow-angle clipping information at time point $t_n$ (i.e., the information for cutting out a narrow-angle image 411a at time point $t_n$ from the wide-angle image 413a), recorded to the recording medium 19.

After a batch of processing including the processing at steps S11 through S21, S31, and S32 is performed with respect to time point $t_n$ (see FIGS. 5, 6A, 6B, and 11), then a batch of processing including the processing at steps S11 through S21, S31, and S32 is performed with respect to time point $t_{n+1}$. When the batch of processing is performed with respect to time point $t_{n+1}$, the symbols "n" and "n+1" in the description of the batch of processing with respect to time point $t_n$ are read as "n+1" and "n+2" respectively. The same applies to the succeeding time points $t_{n+2}$ etc.

Second Modified Operation

Figure 6D:
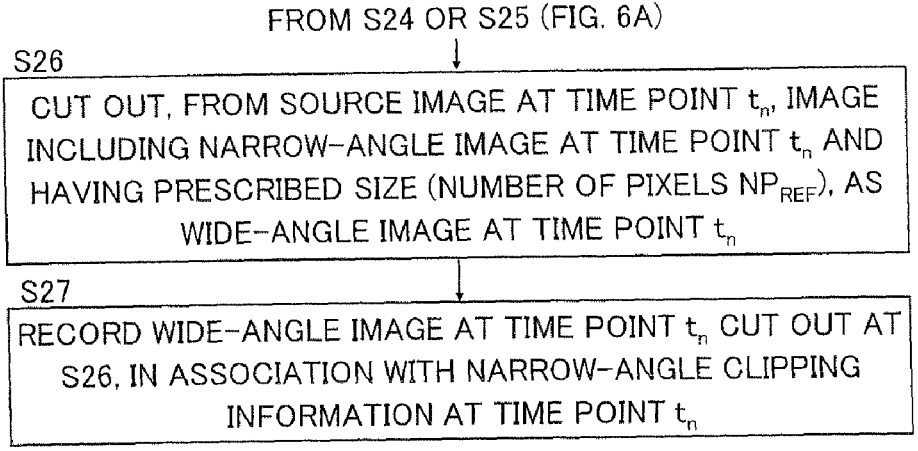
Figure 13:
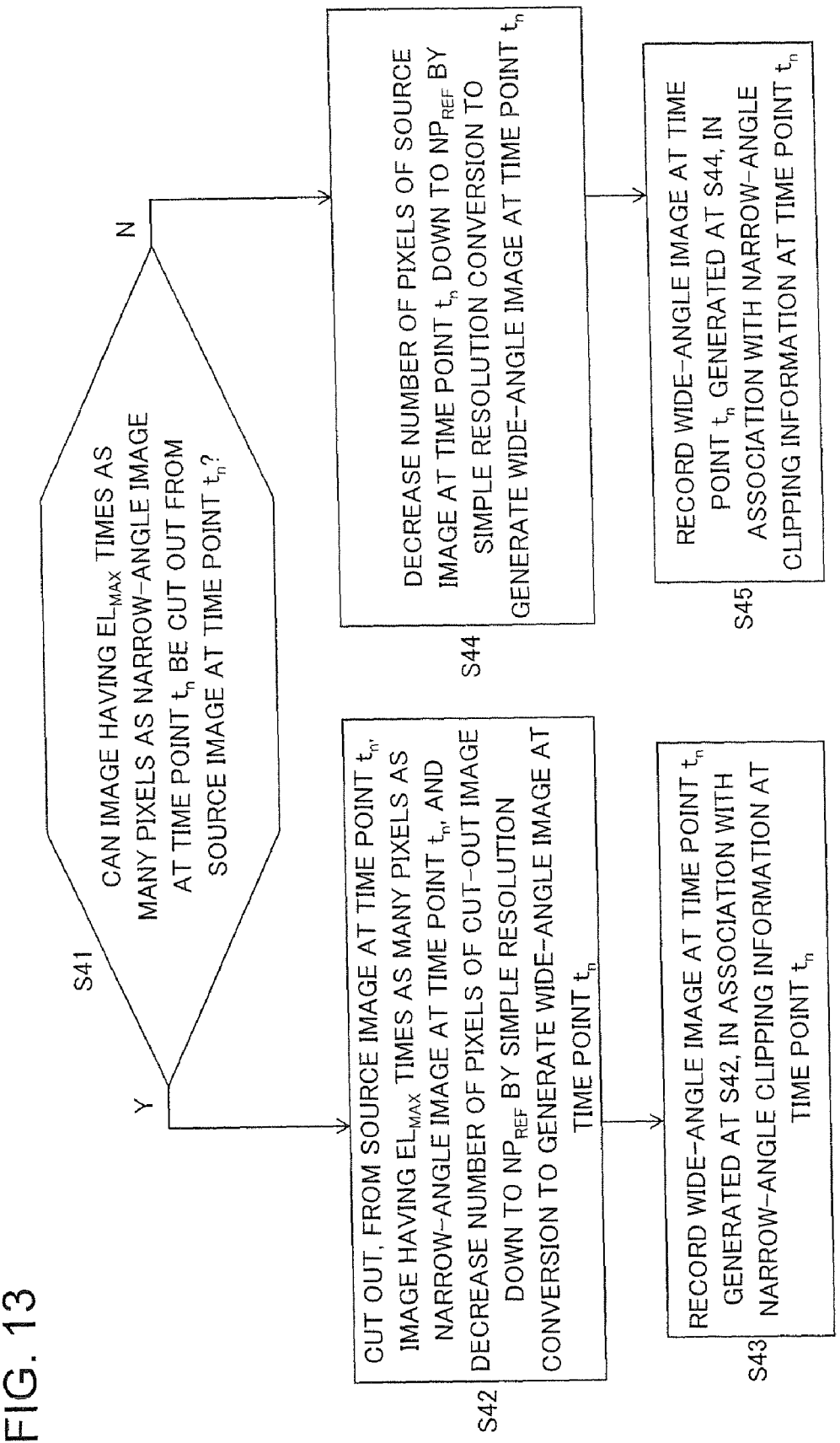
FIG. 13 is a flow chart showing the flow of the second modified operation for moving-image shooting.

The processing performed at steps S26 and S27 in FIG. 6D may be replaced with the processing at steps S41 to S45 shown in FIG. 13. Specifically, if, at step S24 in FIG. 6A, it is found that the optical zoom factor can be decreased, then, on completion of the processing at step S25, instead of the processing at steps S26 and S27, the processing at step S41 and following steps in FIG. 13 may be performed; if, at step S24 in FIG. 6A, it is found that the optical zoom factor cannot be decreased, then, an advance may be made from step S24 to step S41 so that, instead of the processing at steps S26 and S27, the processing at step S41 and following steps in FIG. 13 may be performed. The modified operation in which the processing at step S41 and the following steps is performed will be called the second modified operation. The second modified operation will now be described.

At step S41, to which an advance is made from step S24 or S25 in FIG. 6A, first, based on the narrow-angle clipping information at time point $t_n$ generated at step S13, the wide-angle clipping control portion 17 checks whether or not it is possible to cut out, from the source image at time point $t_n$, an image that includes the narrow-angle image at time point $t_n$ and that has a number of pixels equal to $EL_{MAX}$ times the number of pixels $NP_n$ of the narrow-angle image at time point $t_n$ (i.e., $NP_n \times EL_{MAX}$).

If such an image can be cut out, then, at step S42, the image is actually cut out. Specifically, at step S42, based on the narrow-angle clipping information at time point $t_n$ generated at step S13, an image that includes the narrow-angle image at time point $t_n$ set at step S13 and that has a number of pixels equal to $EL_{MAX}$ times the number of pixels $NP_n$ of the narrow-angle image (i.e., $NP_n \times EL_{MAX}$) is cut out from the source image at time point $t_n$. The image thus cut out will be called the second preliminary wide-angle image. The second preliminary wide-angle image cut out from the source image $t_n$ can be the source image $t_n$ itself. When the processing at step S42 is performed, the ratio $NP_{REF}/NP_n$ is smaller than the upper-limit enlargement factor $EL_{MAX}$, and accordingly the number of pixels of the second preliminary wide-angle image cut out at step S42 is greater than the prescribed number of pixels $NP_{REF}$. The wide-angle clipping control portion 17 decreases the number of pixels of the second preliminary wide-angle image down to the prescribed number of pixels $NP_{REF}$ by simple resolution conversion, and yields the image obtained by decreasing the number of pixels of the second preliminary wide-angle image as the wide-angle image at time point $t_n$ to be extracted from the source image at time point $t_n$.

Subsequently to step S42, at step S43, the image data of the wide-angle image at time point $t_n$ generated at step S42 is, after undergoing compression processing by the compression processing portion 18, recorded to the recording medium 19. At this time, the narrow-angle clipping information at time point $t_n$ generated at step S13 also is, in association with the image data of the wide-angle image at time point $t_n$, recorded to the recording medium 19. The narrow-angle clipping information at time point $t_n$, however, is recorded to the recording medium 19 after being converted into information indicating the position and size of the narrow-angle image at time point $t_n$ on the wide-angle image at time point $t_n$.

Figure 14:
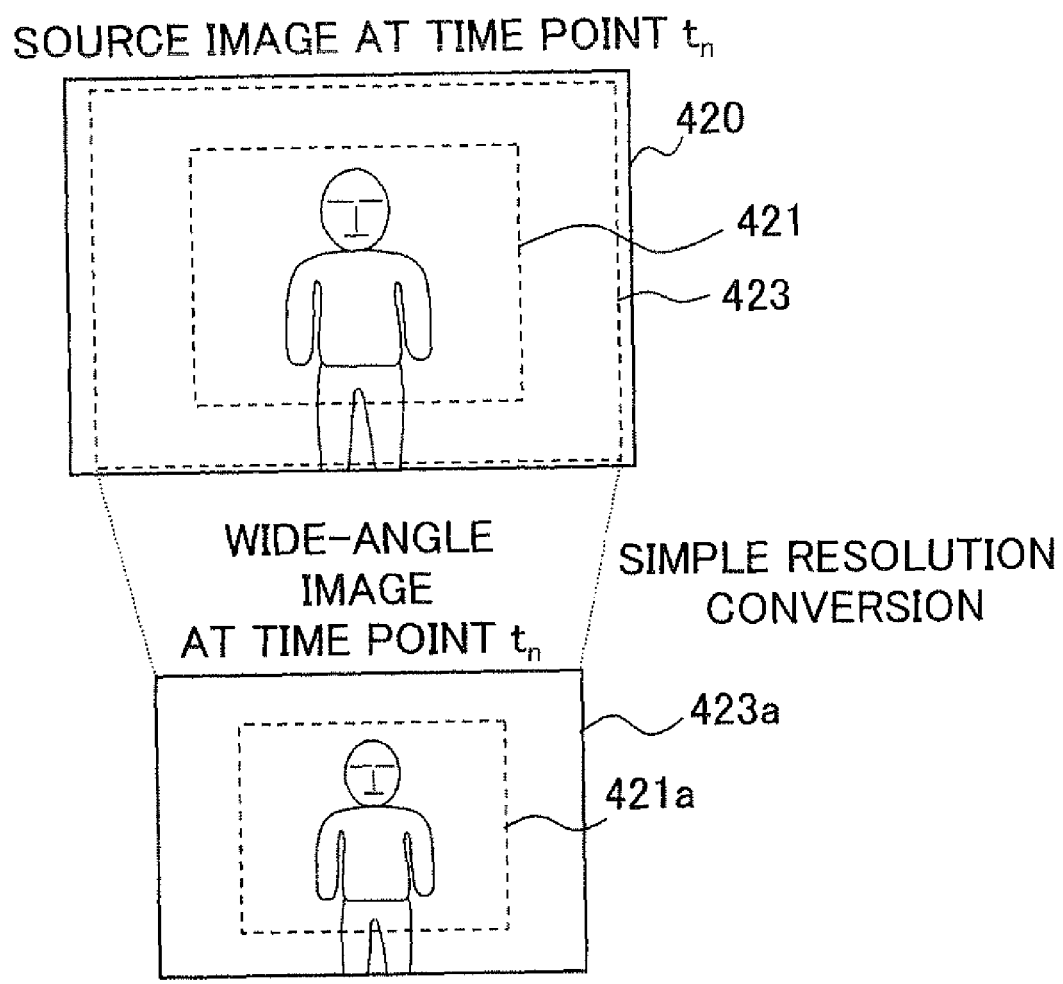
FIG. 14 is a diagram illustrating the second modified operation, showing how a wide-angle image is generated from a source image.

For example, in a case where a source image like the source image 420 shown in FIG. 14 is acquired at time point $t_n$ and then the processing at step S42 is performed, the images inside broken-line rectangular regions 421 and 423 are, as the narrow-angle image and the second preliminary wide-angle image respectively, from the source image 420. The source image 420 in FIG. 14 is the same as that in FIG. 9. In this case, the number of pixels of the second preliminary wide-angle image extracted from the source image 420 is decreased down to the prescribed number of pixels $NP_{REF}$ by simple resolution conversion and thereby a wide-angle image 423a at time point $t_n$, having the prescribed number of pixels $NP_{REF}$ is generated; then the image data of the wide-angle image 423a at time point is, in association with the narrow-angle clipping information at time point $t_n$ (i.e., the information for cutting out a narrow-angle image 421a at time point $t_n$ from the wide-angle image 423a), recorded to the recording medium 19.

By contrast, if, at step S41, it is found that it is not possible to cut out, from the source image at time point $t_n$, an image that includes the narrow-angle image at time point $t_n$ and that has a number of pixels equal to $EL_{MAX}$ times the number of pixels $NP_n$ of the narrow-angle image at time point $t_n$ (i.e., $NP_n \times EL_{MAX}$), instead of the processing at steps S42 and S43, the processing at steps S44 and S45 is performed. For example, in a case where the number of pixels of the narrow-angle image at time point $t_n$ set at step S13 is (960×540), since the number of pixels of the source image is (1600×1200) and in addition $EL_{MAX}$ is 4, it is not possible to cut out from the source image an image having a number of pixels equal to $EL_{MAX}$ times the number of pixels (960×540).

At step S44, the wide-angle clipping control portion 17 generates a reduced image of the source image at time point $t_n$ itself as the wide-angle image at time point $t_n$. Specifically, at step S44, the wide-angle clipping control portion 17 decreases the number of pixels of the source image at time point $t_n$, which originally had a number of pixels of (1600×1200), down to the prescribed number of pixels $NP_{REF}$ by simple resolution conversion, and yields the image obtained by decreasing the number of pixels of the source image at time point $t_n$ as the wide-angle image at time point $t_n$ to be extracted from the source image at time point $t_n$.

Subsequently to step S44, at step S45, the image data of the wide-angle image at time point $t_n$ generated at step S44 is, after undergoing compression processing by the compression processing portion 18, recorded to the recording medium 19. At this time, the narrow-angle clipping information at time point $t_n$ generated at step S13 also is, in association with the image data of the wide-angle image at time point $t_n$, recorded to the recording medium 19. The narrow-angle clipping information at time point $t_n$, however, is recorded to the recording medium 19 after being converted into information indicating the position and size of the narrow-angle image at time point $t_n$ on the wide-angle image at time point $t_n$.

After a batch of processing including the processing at steps S11 through S19, S24, S25, and S41 through S45 is performed with respect to time point $t_n$ (see FIGS. 5, 6A, 6B, and 13), then a batch of processing including the processing at steps S11 through S19, S24, S25, and S41 through S45 is performed with respect to time point $t_{n+1}$. When the batch of processing is performed with respect to time point $t_n+_1$, the symbols "n" and "n+1" in the description of the batch of processing with respect to time point $t_n$ are read as "n+1" and "n+2" respectively. The same applies to the succeeding time points $t_{n+2}$ etc.

The first and second modified operation described above may be performed in combination. The source image at time point $t_n$ may be any of the source images of the first to ith frames mentioned earlier. The time difference between time points $t_n$ and $t_{n+1}$ is the frame period mentioned earlier. Accordingly, for example, if the source image at time point $t_n$ is the source image of the second frame, the source image at time point $t_{n+1}$ is the source image of the third frame. The time difference between time points $t_n$ and $t_{n+1}$ may be an integer times the frame period.

The moving-image shooting operation described with reference to FIGS. 5 and 6A to 6D, or the operation combined with the first and/or second modified operation, is performed every time a source image is shot, so that the image data of the wide-angle images of the first to ith frames is sequentially, after undergoing predetermined compression processing, recorded to the recording medium 19 along with the narrow-angle clipping information of the first to ith frames (i.e., the information indicating the position and size of the narrow-angle images of the first to ith frames on the wide-angle images of the first to ith frames).

Operation at the Time of Playback

On the other hand, when a narrow-angle high-resolution image is displayed, the following processing is performed. The compressed image data of the wide-angle images of the first to ith frames read from the recording medium 19 is fed to the decompression processing portion 20. The decompression processing portion 20 decompresses the image data fed to it to generate the image data in its uncompressed state. Thus, the decompression processing portion 20 generates the image data of the wide-angle images of the first to ith frames.

The image data of the wide-angle images of the first to ith frames from the decompression processing portion 20 and the narrow-angle clipping information of the first to ith frames read from the recording medium 19 are fed to the resolution enhancement processing portion 22. Based on the narrow-angle clipping information of the first to ith frames, the resolution enhancement processing portion 22 sequentially cuts out, from the wide-angle images of the first to ith frames, the narrow-angle images of the first to ith frames, and generates a single narrow-angle high-resolution image from m narrow-angle images by super-resolution processing. How a single narrow-angle high-resolution image is generated from narrow-angle images by super-resolution processing is as described previously. In a case where m=3, the narrow-angle high-resolution image of the first frame is generated from the narrow-angle images of the first, second, and third frames, and the narrow-angle high-resolution image of the second frame is generated from the narrow-angle images of the second, third, and fourth frames. The narrow-angle high-resolution images of the third and following frames are generated likewise.

The resolution enhancement processing portion 22 feeds the image data of the narrow-angle high-resolution images of the first to ith frames generated by super-resolution processing to the display portion 23, so that a moving image consisting of the narrow-angle high-resolution images of the first to ith frames is displayed on the display portion 23.

Although the optical zoom factor is adjusted at the time of shooting with a view to making the number of pixels of the narrow-angle images cut out by the resolution enhancement processing portion 22 equals (640×360), some of the narrow-angle images cut out by the resolution enhancement processing portion 22 may have a number of pixels other than (640×360).

For example, in a case where the source image of the ith frame is the source image at time point $t_n$ and in addition, with the ratio $NP_{REF}/NP_n$ equal to the upper-limit enlargement factor $EL_{MAX}$, the processing at steps S17 and S18 in FIG. 6B is performed, the number of pixels of the narrow-angle image of the ith frame cut out by the resolution enhancement processing portion 22 equals (640×360). By contrast, for example, in a case where the source image of the ith frame is the source image at time point $t_n$ and in addition, with the inequality $NP_{REF}/NP_n > EL_{MAX}$ found to hold at step S19 in FIG. 6A, the processing at steps S22 and S23 in FIG. 6C is performed, the number of pixels of the narrow-angle image of the ith frame cut out by the resolution enhancement processing portion 22 is smaller than (640×360).

When the number of pixels of the narrow-angle image of the ith frame cut out by the resolution enhancement processing portion 22 according to narrow-angle clipping information is not equal to (640×360), the resolution enhancement processing portion 22 first increases or decreases the number of pixels of the narrow-angle image up or down to (640×360) by simple resolution conversion and then performs super-resolution processing. The same applies to the narrow-angle images of other than the ith frame For example, in a case where the numbers of pixels of the narrow-angle images of the first, second, and third frames cut out from the wide-angle images of the first, second, and third frames according to narrow-angle clipping information are $NP_A$, $NP_B$, and $NP_C$ respectively, and where, while the numbers of pixels $NP_A$ and $NP_B$ equal (640×360), the number of pixels $NP_C$ is not equal to (640×360), the number of pixels $NP_C$ of the narrow-angle image of the third frame is increased or decreased up or down to the number of pixels (640×360) by simple resolution conversion to generate a narrow-angle image having a number of pixels of (640×360), and the thus generated narrow-angle image having a number of pixels of (640×360) is handled anew as the narrow-angle image of the third frame; then the narrow-angle high-resolution image of the first frame is generated from the narrow-angle images of the first, second, and third frames.

MODIFICATIONS AND VARIATIONS

The specific values given in the description above are merely examples, which, needless to say, may be modified to any other values. In connection with the embodiments described above, modified examples or supplementary explanations will be given below in Notes 1 to 3. Unless inconsistent, any part of the contents of these notes may be combined with any other.

Note 1: Although the embodiments described above deal with cases where the main subject is a person, the main subject may be other than a person; for example, the main subject may be a vehicle such as an automobile, or a robot that moves around.

Note 2: An image-sensing apparatus 1 according to the invention can be realized in hardware, or in a combination of hardware and software. In particular, the calculation processing performed by the blocks identified by the reference signs 15, 16, 17, and 21 in FIG. 1 can be realized in software, in hardware, or in a combination of hardware and software. In a case where the image-sensing apparatus is built with software, a block diagram showing the part realized in software serves as a functional block diagram of that part. All or part of the calculation processing may be prepared in the form of a program so that, when the program is executed on a program execution device (for example, a computer), all or part of the calculation processing is realized.

Note 3: For example, one possible interpretation is as follows: the zoom lens drive portion 27 in FIG. 1, singly or together with the narrow-angle clipping control portion 16, forms an optical zoom control portion that varies the size of the subject on a source image by optical zooming.

What is claimed is:

1. An image-sensing apparatus comprising:
   an image sensor which sequentially acquires source images by sequential shooting;
   an optical zoom control portion which varies a size of a subject image on the source images by optical zooming;
   a particular subject detection portion which detects a position and a size of a particular subject on the source images based on image data of the source images;
   a narrow-angle image extraction portion which sets, in each of the source images, a narrow-angle image including the particular subject based on a result of detection by the particular subject detection portion, to set a position and a size of the narrow-angle image on image;
   a wide-angle image extraction portion which extracts, from each of the source images, a wide-angle image that includes the narrow-angle image, that has a larger angle of view than the narrow-angle image, and that has a reference number of pixels;
   a resolution enhancement processing portion which cuts out, from a plurality of temporally consecutive wide-angle images, a plurality of narrow-angle images according to a setting in the narrow-angle image extraction portion, to generate, from the plurality of narrow-angle images, a narrow-angle high-resolution image having a number of pixels greater than a number of pixels of the narrow-angle image; and
   a recording portion which records image data of the individual wide-angle images,
   wherein the optical zoom control portion controls a factor of the optical zooming such that a ratio of the reference number of pixels to the number of pixels of the narrow-angle image approaches a factor of enlargement by the resolution enhancement processing portion.

2. The image-sensing apparatus according to claim 1, wherein
   narrow-angle images based on source images shot at first and second time points are called first and second narrow-angle images,
   the second time point is later than the first time point,
   when the ratio of the reference number of pixels to a number of pixels of the first narrow-angle image is greater than the factor of enlargement, the optical zoom control portion increases the factor of optical zooming between the first and second time points and thereby makes, compared with the ratio of the reference number of pixels to the number of pixels of the first narrow-angle image, a ratio of the reference number of pixels to a number of pixels of the second narrow-angle image approach the factor of enlargement.

3. The image-sensing apparatus according to claim 2, wherein
   in a case where the ratio of the reference number of pixels to the number of pixels of the first narrow-angle image is greater than the factor of enlargement, if at the first time point the factor of optical zooming has reached a predetermined upper-limit factor,
   the wide-angle image extraction portion extracts from the source image at the first time point an image that has a number of pixels equal to the factor of enlargement times the number of pixels of the first narrow-angle image and that includes the first narrow-angle image, and yields an image obtained by increasing a number of pixels of the extracted image up to the reference number of pixels by resolution conversion as a wide-angle image to be extracted from the source image at the first time point.

4. The image-sensing apparatus according to claim 1, wherein
   narrow-angle images based on source images shot at first and second time points are called first and second narrow-angle images,
   the second time point is later than the first time point,
   when the ratio of the reference number of pixels to a number of pixels of the first narrow-angle image is smaller than the factor of enlargement, the optical zoom control portion decreases the factor of optical zooming between the first and second time points and thereby makes, compared with the ratio of the reference number of pixels to the number of pixels of the first narrow-angle image, a ratio of the reference number of pixels to a number of pixels of the second narrow-angle image approach the factor of enlargement.

5. The image-sensing apparatus according to claim 4, wherein in a case where the ratio of the reference number of pixels to the number of pixels of the first narrow-angle image is smaller than the factor of enlargement, if at the first time point the factor of optical zooming has reached a predetermined lower-limit factor, the wide-angle image extraction portion extracts from the source image at the first time point an image that has a number of pixels larger than the reference number of pixels and that includes the first narrow-angle image, and yields an image obtained by decreasing a number of pixels of the extracted image up to the reference number of pixels by resolution conversion as a wide-angle image to be extracted from the source image at the first time point.

6. The image-sensing apparatus according to claim 1, wherein the factor of enlargement is an upper-limit factor of enlargement determined as an upper limit of a ratio of the number of pixels of the narrow-angle high-resolution image to the number of pixels of the narrow-angle image, and the resolution enhancement processing portion is so configured as to be able to increase the ratio of the number of pixels of the narrow-angle high-resolution image to the number of pixels of the narrow-angle image up to the upper-limit factor of enlargement.

* * * * *